No. 694,181. Patented Feb. 25, 1902.
V. ODQUIST.
SWING BACK PHOTOGRAPHIC CAMERA.
(Application filed Oct. 1, 1901.)
(No Model.) 2 Sheets—Sheet 1.
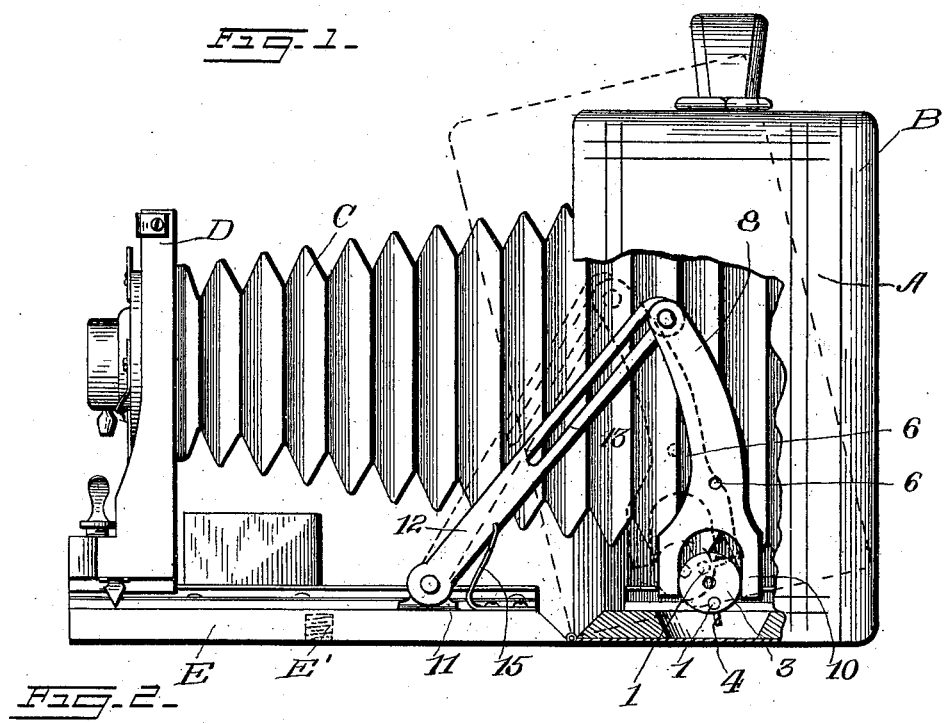
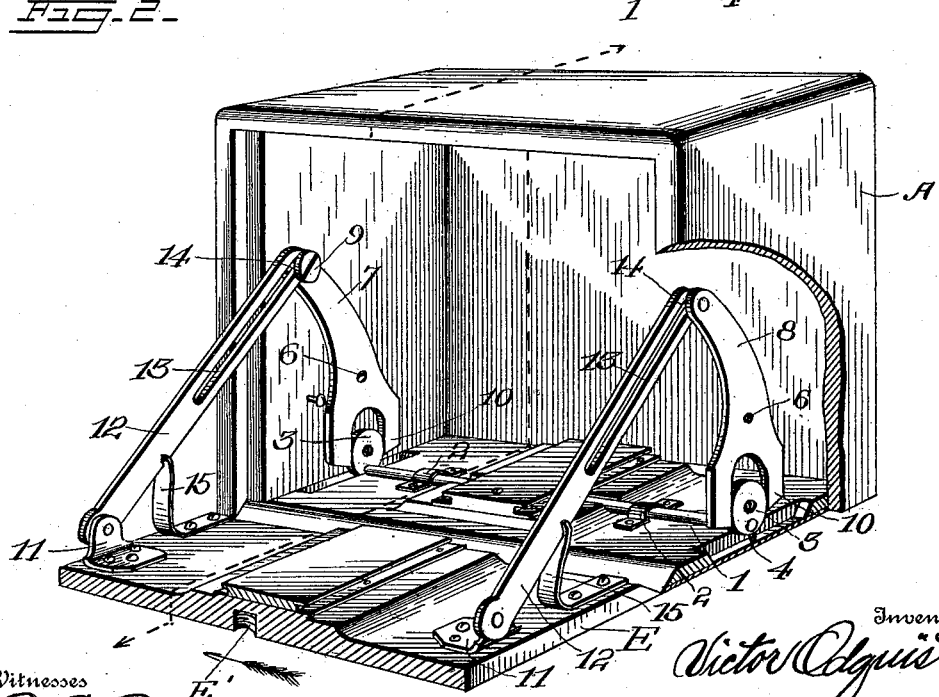

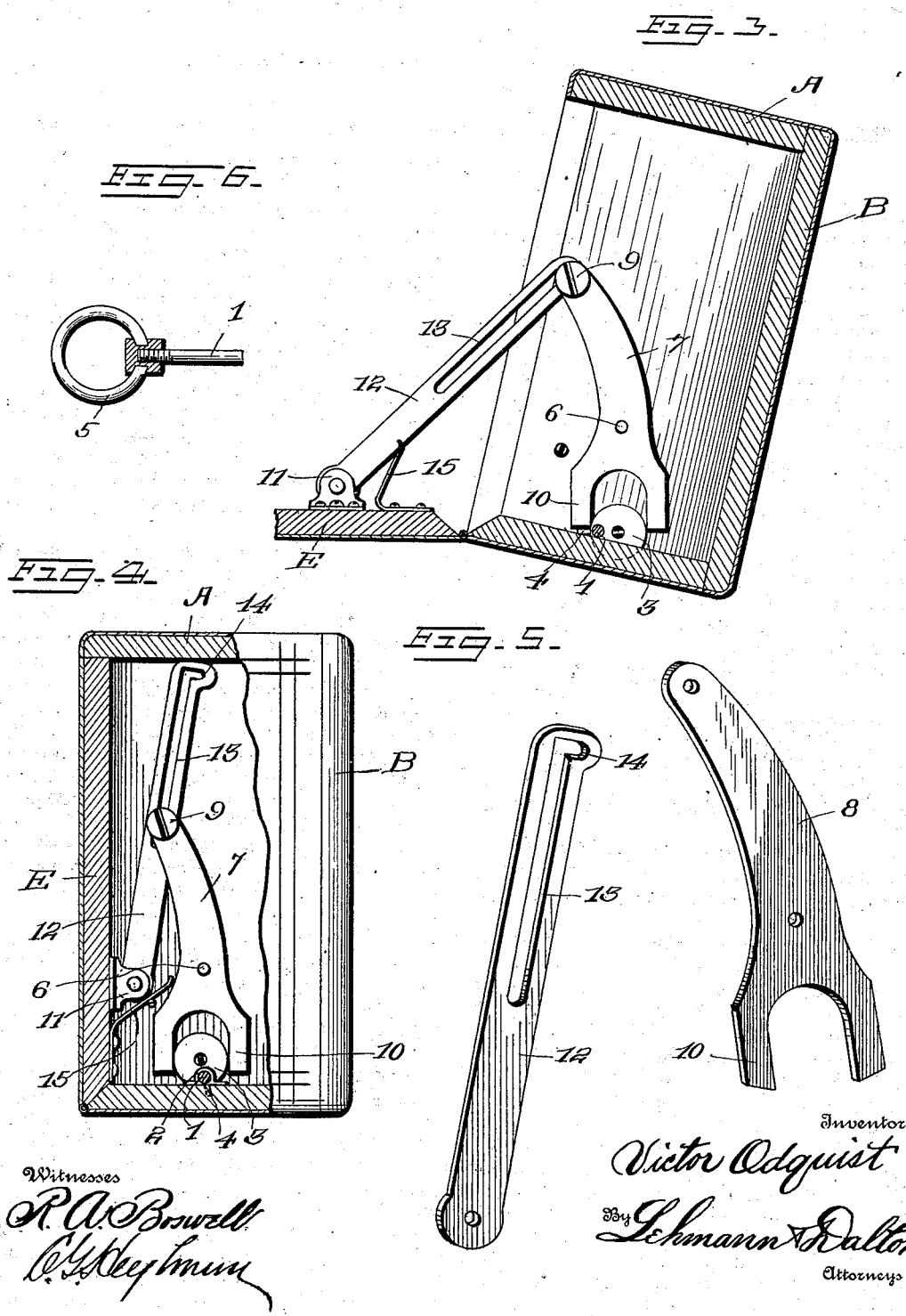

UNITED STATES PATENT OFFICE.

VICTOR ODQUIST, OF CHICAGO, ILLINOIS, ASSIGNOR TO IMPERIAL CAMERA & MFG. CO., OF LA CROSSE, WISCONSIN.

SWING-BACK PHOTOGRAPHIC CAMERA.

SPECIFICATION forming part of Letters Patent No. 694,181, dated February 25, 1902.

Application filed October 1, 1901. Serial No. 77,198. (No model.)

*To all whom it may concern:*

Be it known that I, VICTOR ODQUIST, a citizen of the United States, residing at Chicago, in the county of Cook and State of Illinois, have invented certain new and useful Improvements in Swing-Back Photographic Cameras; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in swing-back photographic cameras, and particularly involves improved means for adjustably swinging the back or plate-case to conform to a true perspective in taking elongated or tall objects.

With this object in view the invention consists in the novel construction of parts and their arrangement and aggroupment in operative combination, as will be hereinafter fully described, so as to distinguish my improvements from other inventions in the art, and then particularly pointed out and distinctly claimed.

I have fully and clearly illustrated the improvements in the accompanying drawings, forming a part of this specification, and wherein—

Figure 1 is a side elevation of the camera, showing the bellows distended and the side of the camera-box broken away and indicated in dotted lines as being tilted. Fig. 2 is a perspective view, partly in section, of the camera bed and box hinged together, showing the tilting or swinging mechanism complete. Fig. 3 is a vertical section through the camera-box and side view of one end of the swinging levers and its link connection, showing the box tilted rearward. Fig. 4 is a detail view showing the position of the levers when the camera is closed. Fig. 5 is a detail view of the lever and link separated. Fig. 6 is a detail view of the turning-key and its shaft.

Referring to the drawings, Fig. 1, the camera has been illustrated as distended or drawn out for use, the box or case being indicated by A, the plate-carrier by B, the bellows by C, the lens-carrier or frame by D, and the bed of the camera by E, said bed being provided with an interiorly-threaded socket E' for engagement with a tripod in a well-known manner. The floor of the case A and the bed E of the camera are hinged together at the front edge of the former and the rear edge of the latter and so that when the bellows is collapsed and within the box or case the bed may be turned up to vertical position and serve as a closure to the case. All these parts and elements may be of any of the approved constructions well known in the art and do not form or constitute elements of my present invention.

Referring now specifically to the parts and elements entering into and constituting my invention, 1 designates a shaft suitably mounted and journaled across the lower floor of the box and disposed so as not to interfere with the movements of the bellows and lens-carrier. An intermediate supporting-bearing 2 may be placed in proper position to keep the shaft in alinement. Eccentrically fixed on each end portion of the shaft 1 contiguously to the inner faces of the vertical sides of the camera-box is a disk 3, which engages between the forked extensions of the rear levers, as hereinafter more specifically mentioned, and in the circumferential face of each disk is a stop-pin 4, which lodges against the end of the forks of the levers and prevents further rotation of the disks. A ring or finger-piece 5 is secured to the projecting end of the actuating-shaft, by which the shaft may be turned with the disks to throw or operate the levers. Pivotally fulcrumed, as at 6, to the inner faces of the vertical side pieces of the camera-box are two levers 7 8, duplicated in construction, the arms extending above the pivotal supports being preferably curved forward and at their upper ends are provided with a headed stud 9, on which the slots of the links engage. The lower arm of the levers 7 8 is forked, as at 10, the forks engaging over the disks 3, so that the levers are rocked on their supports by the rotation of the eccentrically-mounted disks. Oppositely placed on the camera-bed are mounted and secured bearing-brackets 11, to which the lower ends of links 12 are pivotally secured. The links 12 are formed with elongated slots 13, terminating in a catch-notch 14 at their upper ends. The main portion of the slots 13 slidingly engage on the neck of the headed studs, and the notches at the ends lock on the studs to hold the ends of the links in operative engagement. Springs 15, mounted on the rear end of the camera-bed, bear upward with their free ends on the links 12 and hold the catch-notches in engagement.

It will be perceived from the foregoing description, taken in connection with the drawings, that a swing-back adjusting mechanism has been provided which may be readily, easily, and accurately adjusted to suit the lines of production of a true perspective.

To manipulate the swing-back mechanism, the camera-bed is let down, the camera-front is then run out, and the bellows distended. The focus may then be ascertained, and then if the relation of the lens and the plate require adjustment recourse is had to the swing-back mechanism. The shaft, with disks, is rotated, and through the medium of the levers and link connections with the camera-bed and the plate-box the lines of perspective are readily and accurately ascertained.

Having thus described my invention, what I claim is—

1. In a swing-back photographic camera, the combination of a camera-bed, a swing-back hinged to the camera-bed, links pivotally supported in the swing-back, levers pivotally supported on the camera-bed, and slidingly connected to the upper ends of the levers in the swing-back, and means in the swing-back to engage the levers therein and tilt the back.

2. In a swing-back photographic camera, the combination of a camera-bed, a swing-back hinged thereto, levers pivotally supported in the swing-back and formed with forked lower ends, and studs at their upper ends, a shaft journaled across the swing-back, disks eccentrically mounted on the shaft to engage between said forks, and links pivotally mounted on the camera-bed, and formed with elongated slots to slidingly engage on the studs of the levers.

3. In a swing-back photographic camera, the combination with a swing-back and a camera-bed hinged together, of levers and links fulcrumed to the swing-back and camera-bed and having upper ends slidably interengaging, and means in the swing-back to rock the levers therein and tilt the back.

4. In a swing-back photographic camera, the combination with the camera-bed and the swing-back, hinged together, of levers pivotally supported in the swing-back and formed with forked lower ends and provided with headed studs in their upper ends, links pivotally mounted on the camera-bed and formed with elongated slots terminating in catch-notches to interlock with the said studs, springs to keep the studs and catch-notches in detachable engagement, a rotatable shaft in the swing-back, and disks eccentrically mounted on the shaft and engaging between the forked end of the levers.

In testimony whereof I affix my signature in presence of two witnesses.

VICTOR ODQUIST.

Witnesses:
H. E. MILLER,
EDNA A. CALLMAN.